Jan. 6, 1925.　　　　　　　　　　　　　　　　　1,521,667
C. BAKER
RATCHET PEDAL
Filed June 3, 1924　　　2 Sheets-Sheet 1
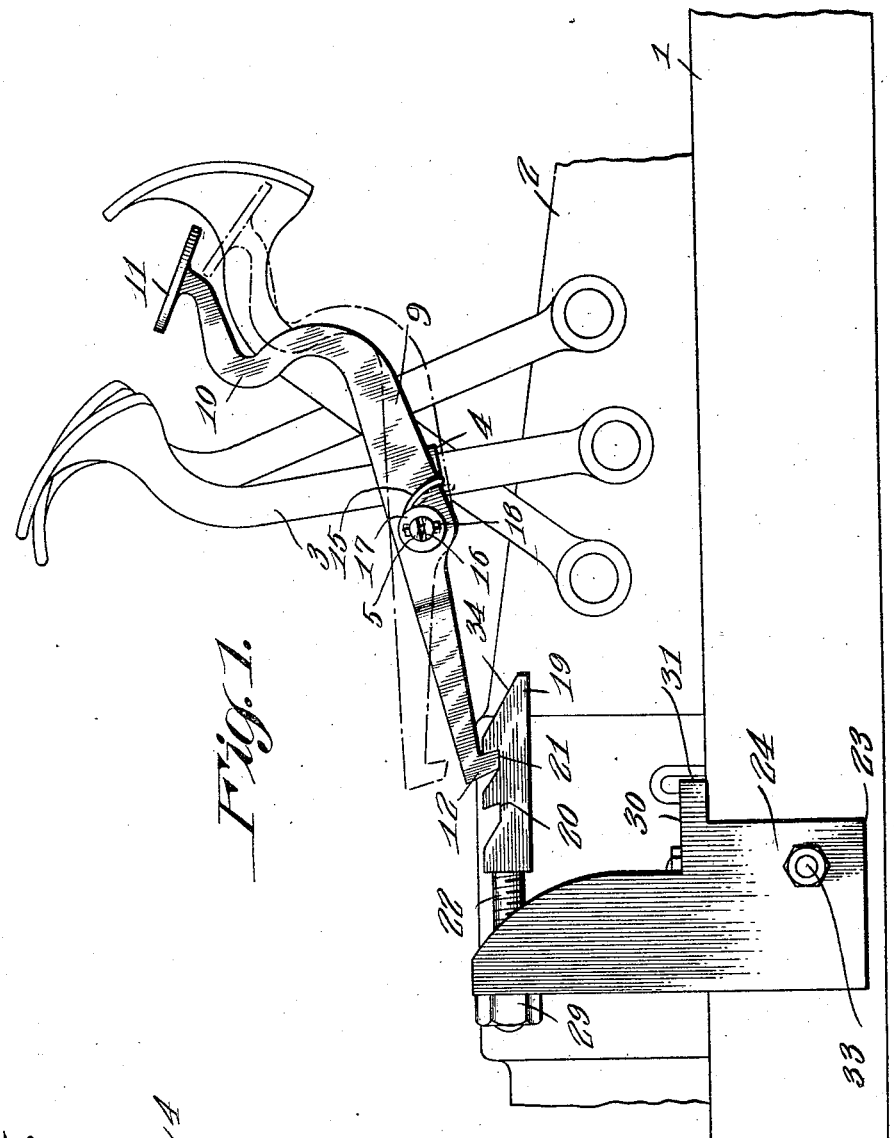
Inventor
C. Baker
By CASnow &Co
Attorney Jan. 6, 1925.
C. BAKER
RATCHET PEDAL
Filed June 3, 1924
1,521,667
2 Sheets-Sheet 2
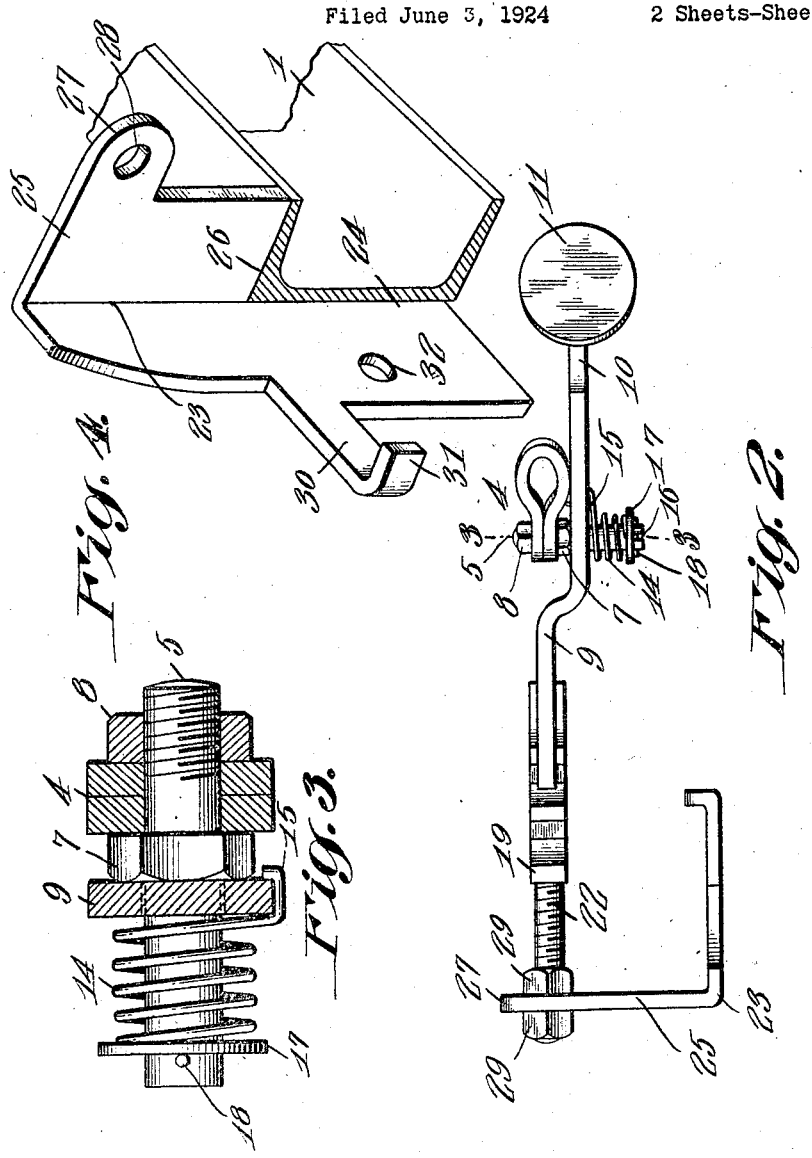
C. Baker, Inventor Patented Jan. 6, 1925.

1,521,667

UNITED STATES PATENT OFFICE.

CONARD BAKER, OF FLORENCE, KANSAS.

RATCHET PEDAL.

Application filed June 3, 1924. Serial No. 717,574.

*To all whom it may concern:*

Be it known that I, CONARD BAKER, a citizen of the United States, residing at Florence, in the county of Marion and State of Kansas, have invented a new and useful Ratchet Pedal, of which the following is a specification.

This invention aims to provide a simple means whereby the speed-change pedal of a Ford car may be held in neutral or in low, releasably, at the will of an operator.

In the drawings:—

Figure 1 shows, in side elevation, a portion of a Ford car whereunto the device forming the subject matter of this application has been applied;

Figure 2 is a top plan of the device per se;

Figure 3 is a section on the line 3—3 of Figure 2, remote parts being omitted, and parts being left in elevation;

Figure 4 is a perspective view, showing the bracket which is mounted on one of the chassis bars of the car;

Figure 5 is a perspective view disclosing the clamp or fulcrum for the foot lever.

The numeral 1 marks one of tne frame bars of an automobile, the transmission casing appearing at 2, and the speed change pedal being designated by the numeral 3. A loop-shaped fulcrum member or clamp 4 is mounted on the pedal 3 and is held thereon by a securing element or spindle 5 passing through openings 6 in the clamp 4. The securing element 5 has a fixed head 7, so shaped as to cooperate with a wrench, a nut 8 being threaded on the securing element, the clamp or fulcrum member 4 being held on the pedal 3 because the arms of the clamp are bound between the head 7 and the nut 8. The securing element or spindle 5 is not threaded into the openings 6 of the clamp 4.

An auxiliary pedal 9 is fulcrumed intermediate its ends on the spindle 5 in engagement with the head 7 of the spindle. The rear end of the auxiliary pedal 9 is upwardly extended as at 10 and carries a heel plate 11. The forward end of the auxiliary pedal 9 has a fixed depending pawl 12. A helical spring 14 surrounds the outer end of the spindle 5. The spring 14 has an inner finger 15 engaged beneath the auxiliary pedal 9 behind the fulcrum 5 of the pedal, the tendency of the spring 14 being to swing the forward end of the pedal 9 and the pawl 12 downwardly. The outer end of the spring 14 may be secured to the spindle 5 in any desired way. As shown, the spindle 5 is provided in its outer end with a slot 16 receiving the outer end of the spring 14, the spring being held on the part 5 by a washer 17 mounted on the part 5 and held thereon by a pin 18, or otherwise.

The numeral 19 denotes a keeper having seats 20 and 21 in its upper edge, the seats being spaced longitudinally of the keeper and being adapted to receive the pawl 12 on the auxiliary pedal 9, the seats 20 and 21 being so constructed that the pawl 12 can slide forwardly from the seat 21 to the seat 20, but not backwardly from the seat 20 to the seat 21, unless the pedal 9 is tilted to overcome the action of the spring 14. At this point it may be noted that if the nut 8 is loosened, a spanner wrench may be applied to the head 7 to secure a rotation of the spindle 5 in the openings 6 of the clamp 4, thereby to adjust the effort of the spring 14 on the pedal 9, and after the spring has been adjusted, the nut 8 can be tightened up again so as to hold the spindle 5 against rotation and to cause the clamp 4 to grip the pedal 3. The keeper 19 includes a forwardly extended threaded stem 22.

The numeral 23 marks an angle bracket having a long flange 24 and a short flange 25 disposed at right angles to the flange 24. The flange 24 extends along the outer surface of the frame bar 1 and the lower edge of the flange 25 forms a shoulder 26 which rests on the upper surface of the frame bar 1, as shown in Figure 4. The flange 25 has an inwardly extended ear 27 provided with an opening 28 wherein the stem 22 of the keeper 19 is adjustable, nuts 29 being threaded on the stem and cooperating with the ear 27 of the bracket 23 to hold the keeper 19 in adjusted positions longitudinally of the pedal 9. The flange 24 has a rearwardly extended arm 30 provided with an inwardly prolonged finger 31 engaging the upper edge of the frame bar 1. The flange 24 is supplied with an opening 32 adapted to receive a bolt or other securing element 33 mounted in the frame bar 1. Owing to the presence of the securing element 33, the bracket 23 is held down on the frame bar 1. The shoulder 26 prevents the bracket 23 from swinging forwardly, and the finger 31 prevents the bracket from swinging rearwardly, it being necessary to use but one securing element 33 to hold the bracket on the frame bar 1.

In practical operation, when the pedal 3 is swung forwardly from high toward neutral, the pawl 12 slides along the inclined rear edge 34 of the keeper 19 and engages the seat 21 to hold the pedal 3 in neutral. Similarly, when the pedal 3 is swung forwardly again, the pawl 12 engages in the seat 20 and holds the pedal 3 in low. These operations take place automatically, owing to the action of the spring 14 on the pedal 9; but when the operator wishes to swing the pedal 3 backwardly from low toward high, the pedal 9 is tilted, the heel of the operator being placed on the plate 11 whilst the toe of the operator is on the upper end of the pedal 3.

I claim:

1. In a device of the class described, an angle bracket comprising a long flange and a short flange, the long flange being adapted to overlap the frame bar of a vehicle, and the short flange being adapted to engage the upper edge of the bar, the long flange having an inwardly extended finger adapted to engage the upper edge of the bar, means for securing the long flange to the bar, a keeper carried by the short flange, an auxiliary pedal having means for engaging the keeper, and mechanism for fulcruming the auxiliary pedal intermediate its ends on the speed change pedal of a vehicle.

2. In a device of the class described, a keeper, means for mounting the keeper on a vehicle, a clamp so constructed as to receive a pedal on the vehicle, an auxiliary pedal, a spindle whereon the auxiliary pedal is mounted to swing into and out of engagement with the keeper, a torsion spring extended around the spindle and secured at one end to the spindle, the other end of the spring cooperating with the auxiliary pedal to hold the same yieldably engaged with the keeper, the spindle being rotatably adjustable in the auxiliary pedal and in the clamp to vary the tension of the spring, the spindle having a head whereby it may be rotated, the head constituting an abutment for the auxiliary pedal under the action of the spring, and means on the spindle for binding the clamp against the head, thereby to hold the clamp in place and to hold the spindle against rotation.

3. In a device of the class described, an auxiliary pedal, means for mounting the auxiliary pedal for tilting movement on the speed-change pedal of a vehicle, a bracket, means for mounting the bracket on a vehicle, a keeper having two seats wherewith the auxiliary pedal is adapted to engage, the seats being located in one edge of the keeper, and said edge of the keeper being plane, saving for the said two seats, and means for mounting the keeper in the bracket for adjustment in the direction of the length of the keeper, thereby to position either one of the said two seats for engagement with the auxiliary pedal.

In testimony that I claim the foregoing as my own, I have hereto affixed my signature in the presence of two witnesses.

CONARD BAKER.

Witnesses:
B. K. GRAHAM,
G. M. LINCOLN.